US012617069B2

(12) United States Patent
Wang et al.

(10) Patent No.: US 12,617,069 B2

(45) Date of Patent: May 5, 2026

(54) FLIP COVER LOCKING DEVICE AND POWER HEAD

(71) Applicant: Greenworks (Jiangsu) Co., Ltd, Changzhou (CN)

(72) Inventors: Yu Wang, Changzhou (CN); Feng Jiang, Changzhou (CN)

(73) Assignee: Greenworks (Jiangsu) Co., Ltd, Changzhou (CN)

(*) Notice: Subject to any disclaimer, the term of this patent is extended or adjusted under 35 U.S.C. 154(b) by 0 days.

(21) Appl. No.: 18/822,499

(22) Filed: Sep. 3, 2024

(65) Prior Publication Data

US 2025/0073886 A1 Mar. 6, 2025

(30) Foreign Application Priority Data

Sep. 6, 2023 (CN) ......................... 202322424421.4

(51) Int. Cl.
*B25F 5/02* (2006.01)

(52) U.S. Cl.
CPC ..................................... *B25F 5/02* (2013.01)

(58) Field of Classification Search
CPC ....... B65D 45/08; B65D 45/18; Y10S 292/38; Y10T 292/0862; Y10T 292/0867; B25F 5/02
See application file for complete search history.

(56) References Cited

U.S. PATENT DOCUMENTS

| | | | | |
|---|---|---|---|---|
| 4,158,246 A * | 6/1979 | Meadows | A46B 13/02 | 15/28 |
| 4,817,991 A * | 4/1989 | Frentzel | F16L 37/008 | 285/317 |
| 9,975,672 B2 | 5/2018 | Crull | | |
| 2006/0254897 A1 | 11/2006 | Hamisch et al. | | |
| 2020/0114503 A1* | 4/2020 | Li | B25H 3/02 | |

FOREIGN PATENT DOCUMENTS

| | | |
|---|---|---|
| DE | 102007042972 A1 | 6/2008 |
| EP | 2338650 A2 | 6/2011 |
| EP | 2474393 B1 | 4/2016 |
| GB | 2449970 A | 12/2008 |
| GB | 2490069 A | 10/2012 |
| JP | 6715329 B2 | 7/2020 |
| SE | 529357 C2 | 7/2007 |

OTHER PUBLICATIONS

Extended European Search Report of Counterpart European Patent Application No. 24198202.4 issued on Feb. 13, 2025.

* cited by examiner

*Primary Examiner* — Daniel Jeremy Leeds

(57) ABSTRACT

A flip cover locking device includes a housing, a cover body, a flip cover and an biasing component. The cover body is rotatably connected with the housing, and can be opened and closed relative to the housing. A first end of the flip cover is pivotally connected with the cover body, and a second end of the flip cover is buckled with the housing. The biasing component is arranged between the cover body and the flip cover, and can be deformed under an action of an external force. The flip cover includes a locked state and an activated state. In the locked state, the biasing component is in a free state, the flip cover is fixedly connected with the housing. In the activated state, the biasing component is compressed, the flip cover is released from the housing and can rotate relative to the cover body.

9 Claims, 10 Drawing Sheets

FLIP COVER LOCKING DEVICE AND POWER HEAD

CROSS REFERENCE TO RELATED APPLICATION

The present application claims the priority of the following Chinese patent application: serial No. 202322424421.4, filed on Sep. 6, 2023; the disclosure of which is hereby incorporated by reference herein in its entirety for all purposes.

TECHNICAL FIELD

The disclosure relates to a flip cover locking device and a power head and belongs to a field of garden tools.

BACKGROUND

In order to more easily replace the battery pack of the power head, a lockable flip cover is usually arranged on the outside of the battery pack cavity. However, the conventional flip covers are mostly locked by magnets or buckles. When the flip cover is not locked, it cannot be directly observed. As a result, during the operation of the power head, the flip cover may be opened, causing the battery pack to slide out of the battery pack cavity.

In view of this, it is necessary to improve the conventional flip cover locking device and the power head to solve the problems mentioned above.

SUMMARY

One or more embodiments of the disclosure provide a flip cover locking device and a power head, which solves a problem that a flip cover cannot be observed when it is in an activated mode by pivotally connecting a first end of the flip cover to a cover body and buckling a second end of the flip cover to the housing.

One or more embodiments of the disclosure provide a flip cover locking device. The flip cover locking device includes a housing, a cover body, a flip cover and an biasing component.

The cover body is rotatably connected with the housing and can be opened and closed relative to the housing.

A first end of the flip cover is pivotally connected with the cover body, and a second end of the flip cover is buckled with the housing.

The biasing component is arranged between the cover body and the flip cover, and can be deformed under an action of an external force.

The flip cover includes a locked state and an activated state, when the flip cover is in the locked state, the biasing component is in a free state, the flip cover is fixedly connected with the housing, the cover body is in a closed state, when the flip cover is in the activated state, the biasing component is compressed, and the flip cover is released from the housing and can rotate relative to the cover body, so that the cover body can be opened relative to the housing.

In an embodiment of the disclosure, an active area allowing the flip cover to move is provided between the cover body and the flip cover, when the flip cover is pushed to move toward the cover body, the biasing component is squeezed and deformed, the flip cover can rotate relative to the cover body, when the flip cover is released, the biasing component is reset, and the flip cover is reset under an action of a rebound force.

In an embodiment of the disclosure, the cover body is provided with a limiting block, the flip cover is correspondingly provided with a limiting component, and two ends of the biasing component are respectively sleeved on the limiting block and the limiting component, and can be deformed along with a movement of the flip cover in the active area.

In an embodiment of the disclosure, the flip cover includes a cover board and a connecting shaft connected with the cover board, the cover board is provided with a through hole, the connecting shaft passes through the through hole and is movably connected with the cover board, so that the cover board is pivotally connected with the cover body through the connecting shaft.

In an embodiment of the disclosure, the cover body is provided with a matching part protruding toward the cover board, and the cover board is correspondingly provided with an engaging part, the engaging part is sleeved on an outer side of the matching part to limit the connecting shaft between the matching part and the engaging part.

In an embodiment of the disclosure, a groove is concavely formed on a side of the matching part facing the cover board, when the engaging part is sleeved on the outer side of the matching part, the groove and the engaging part together enclose an accommodating cavity, and the connecting shaft is accommodated in the accommodating cavity.

In an embodiment of the disclosure, the cover board is provided with an assembling groove, and the engaging part is accommodated in the assembling groove.

In an embodiment of the disclosure, two biasing components are provided, the two biasing components are spaced apart from each other, two matching parts are provided, and the two matching parts are respectively arranged on two sides of the two biasing components.

In an embodiment of the disclosure, a buckle is arranged on one side of the housing close to the cover body, a buckle component is correspondingly arranged on the flip cover, and the buckle and the buckle component are matched with each other to realize a buckle connection between the flip cover and the housing.

One or more embodiments of the disclosure provide a power head. The power head includes a battery pack cavity and the flip cover locking device.

The flip cover locking device includes the housing, the cover body, the flip cover and the biasing component.

The battery pack cavity is accommodated in the housing.

The cover body is rotatably connected with the housing and can be opened and closed relative to the housing.

A first end of the flip cover is pivotally connected with the cover body, and a second end of the flip cover is buckled with the housing.

The biasing component is arranged between the cover body and the flip cover, and can be deformed under an action of an external force.

The flip cover includes a locked state and an activated state, when the flip cover is in the locked state, the biasing component is in a free state, the flip cover is fixedly connected with the housing, the power head is in a closed state, when the flip cover is in the activated state, the biasing component is compressed, and the flip cover is released from the housing and can rotate relative to the cover body, at this time the cover body can be opened relative to the housing and exposes the battery pack cavity.

Beneficial effects of one or more embodiments of the disclosure are: the flip cover of the flip cover locking device can be observed when the flip cover is not locked through pivotally connecting a first end of the flip cover with the cover body and buckling a second end of the flip cover to the housing. At the same time, a biasing component that can be deformed under the action of external force is arranged between the cover body and the flip cover, so that the flip cover can be switched between a locked mode and an activated mode, and a switching method is simple and practical.

DETAILED DESCRIPTION

In order to enable a purpose, technical solutions and advantages of the disclosure to be clearer, the disclosure is described in detail below with reference to accompanying drawings and specific embodiments.

Figure 1:
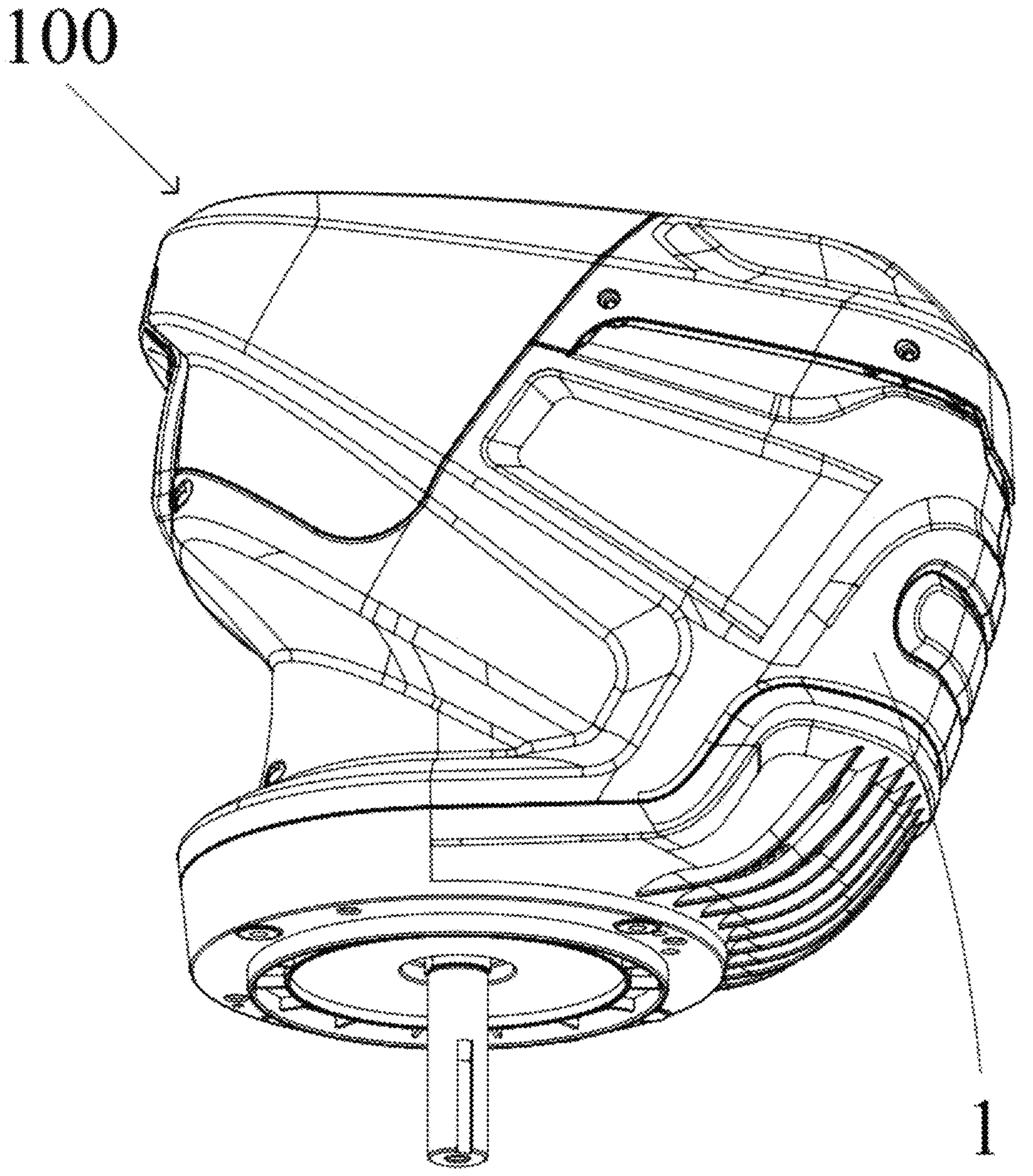
FIG. 1 is a schematic structural view of a power head of the disclosure according to at least one embodiment of the disclosure.
Figure 2:
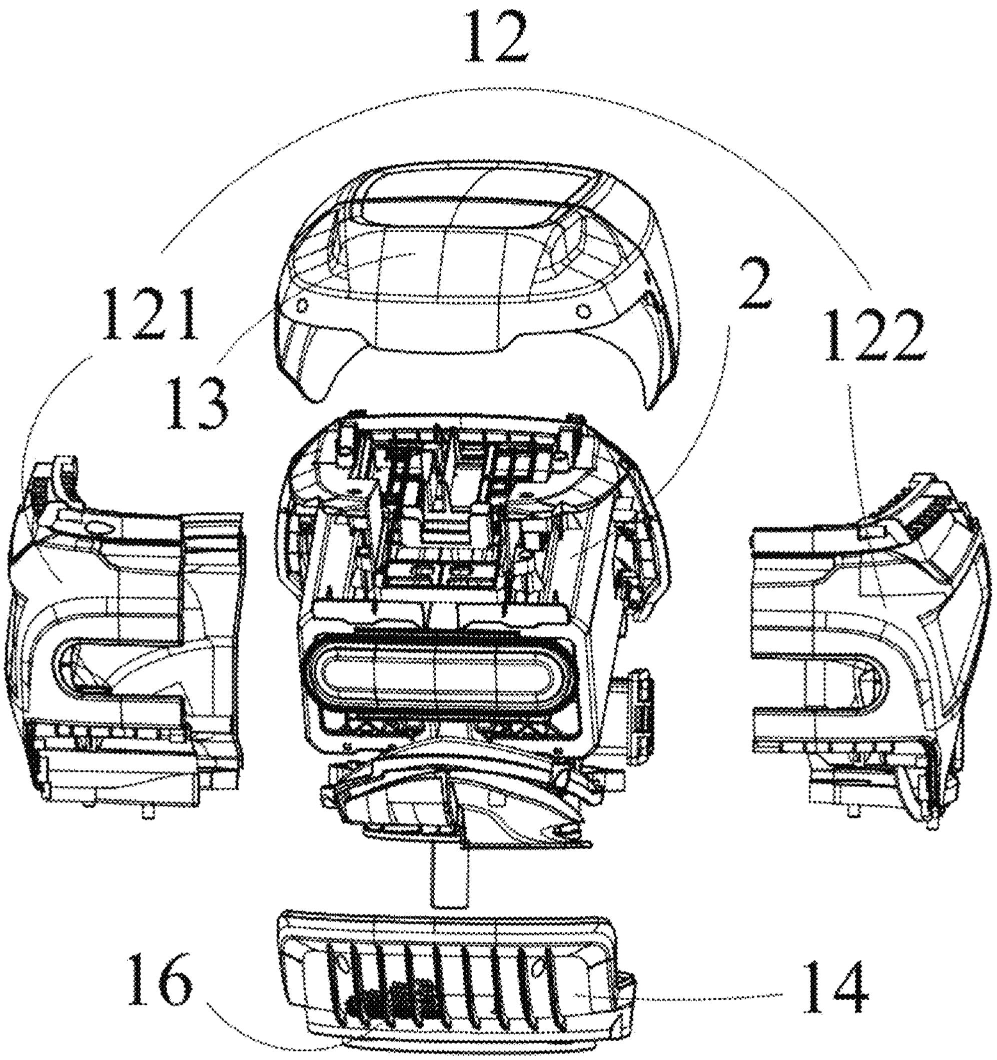
FIG. 2 is an exploded view of a casing in FIG. 1.
Figure 3:
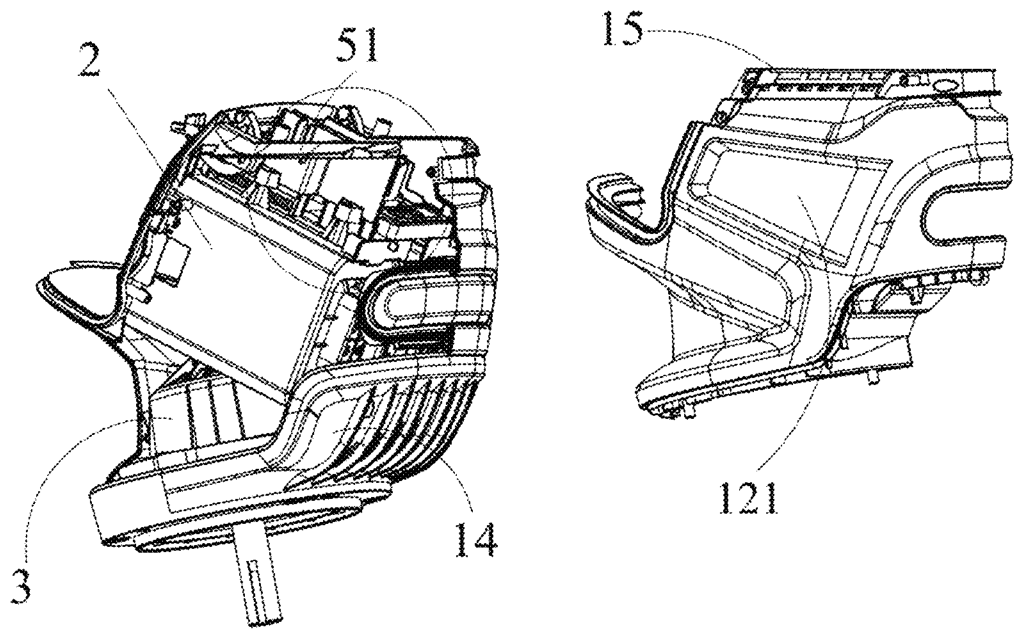
FIG. 3 is an exploded view of a first housing in FIG. 1.

Please refer to FIG. 1 through FIG. 3. One or more embodiments of the disclosure provide a power head 100. The power head 100 includes a casing 1, a battery pack cavity 2 and a motor 3. A housing cavity 11 is arranged in the casing 1. The battery pack cavity 2 and the motor 3 are both housed in the housing cavity 11 and arranged in an upper and lower manner, and the motor 3 is located below the battery pack cavity 2.

An air inlet 15 is located at an upper portion of the casing 1, and an air outlet 16 is located at a bottom of the casing 1. The air outlet 16 is arranged close to the motor 3. A guiding air passage (indicated by an arrow in a drawing) is arranged at the air inlet 15. The guiding air passage is used to guide airflow entering from the air inlet 15 into the housing cavity 11, sink along the battery pack cavity 2 into the motor 3, and be discharged from the air outlet under an action of the motor 3. As a result, an air path is formed by the airflow, and the airflow passes through the battery pack cavity 2 and the motor 3 under an action of the guiding air passage, so as to cool down and dissipate heat of the battery pack cavity 2 and the motor 3 at the same time.

In an embodiment, the casing 1 includes a housing 12 and a cover body 13. The housing 12 includes a first housing 121 and a second housing 122. The first housing 121 and the second housing 122 are assembled with each other and formed an outer side of the power head 100. The cover body 13 is covered above the housing 12, rotatably connected with the housing 12 and can be opened or closed relative to the housing 12.

The casing 1 further includes a base 14. The base 14 is arranged below the housing 12 and fixedly connected with the housing 12. The cover body 13, the housing 12 and the base 14 are assembled with each other to form the housing cavity 11 for housing the battery pack cavity 2 and the motor 3. The air inlet 15 is arranged on an upper portion of the housing 12, and the air outlet 16 is arranged on the base 14.

The power head 100 further includes an air guiding plate. The air guiding plate is matched with the battery pack cavity 2 and the motor 3 to form a complete guiding air passage, so that the airflow enters from the air inlet 15, passes through the battery pack cavity 2 and the motor 3, and is discharged from the air outlet 16 to dissipate heat from the battery pack cavity 2 and the motor 3.

Figure 8:
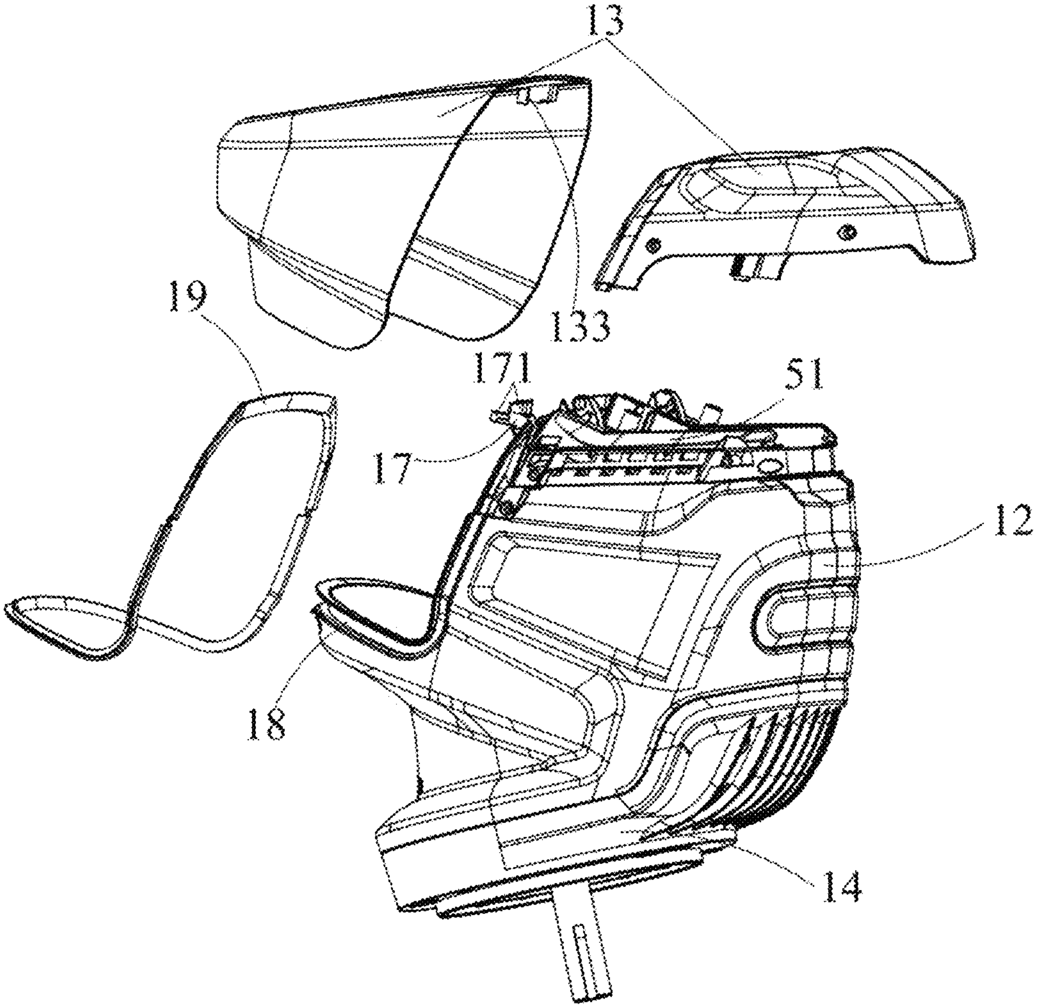
FIG. 8 is an exploded view of a cover body and a mounting belt in FIG. 1.

Please refer to FIG. 8. The air guiding plate includes a first air guiding plate 51 and a second air guiding plate 52. A first end of the first air guiding plate 51 is fixed to an upper portion of the casing 1, and a second end of the first air guiding plate 51 extends into the housing cavity 11 and is arranged apart from an inner side wall of the casing 1. The guiding air passage is formed between the first air guiding plate 51 and the inner side wall of the casing 1. In other words, the first air guiding plate 51 is fixed between the cover body 13 and the housing 12. In some embodiments, there are two first air guiding plates 51, which are respectively arranged on two sides of the power head 100.

Figure 4:
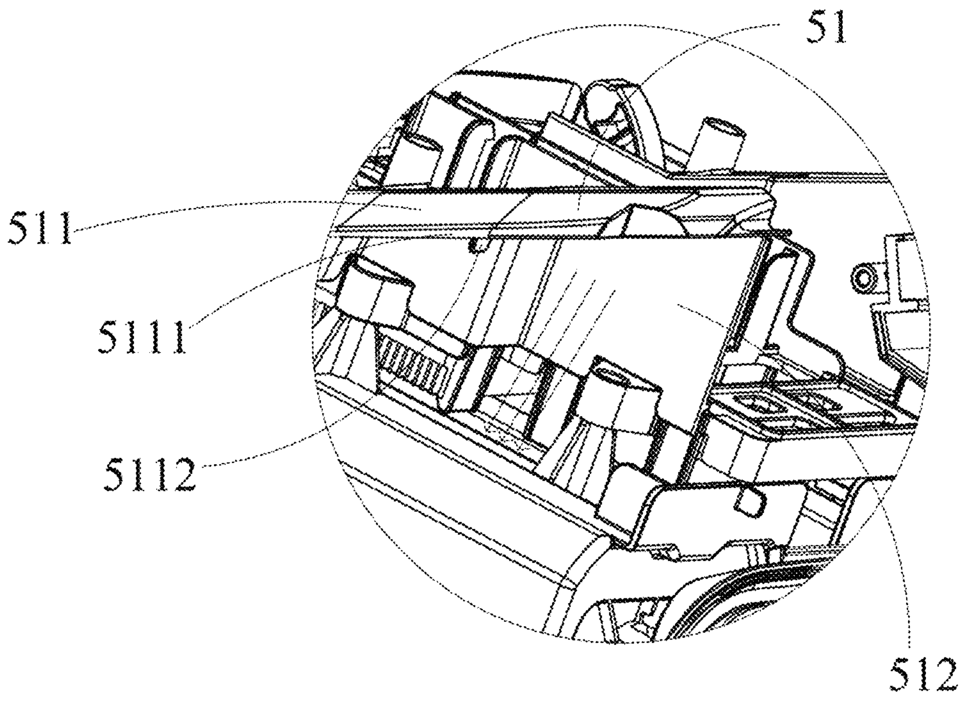
FIG. 4 is a partial enlarged view of FIG. 3.
Figure 5:
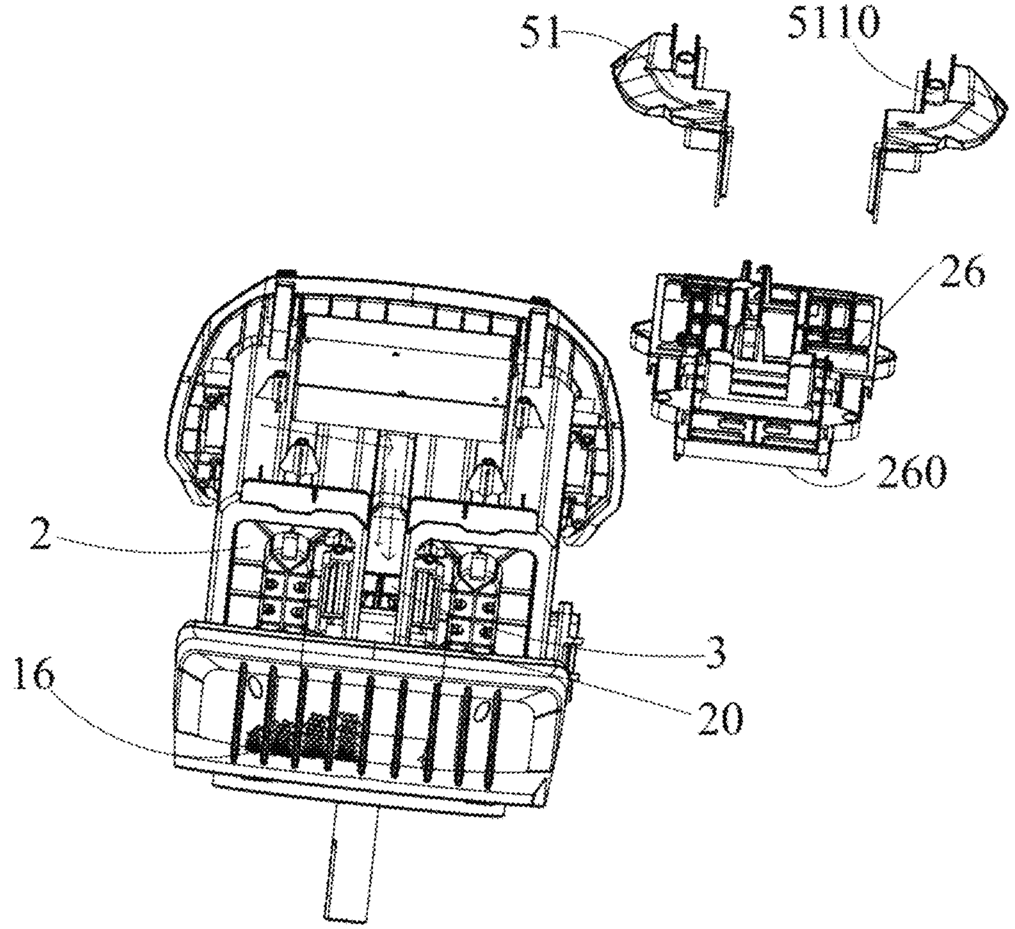
FIG. 5 is an exploded view of FIG. 2 without the casing.

Please refer to FIG. 4 and FIG. 5. The first air guiding plate 51 includes a first air guiding piece 511 partially covering the housing 12 and a second air guiding piece 512 extending from the first air guiding piece 511 into the housing cavity 11. The first air guiding piece 511 and the second air guiding piece 512 are perpendicular to each other, and the guiding air passage is formed between the second air guiding piece 512 and the inner side wall of the casing 1.

In this embodiment, the first air guiding piece 511 is provided with a reserved hole 5110, and the cover body 13 is correspondingly provided with a reserved post (not shown). The reserved post is accommodated in the reserved hole 5110 to achieve a fixed connection between the cover body 13 and the first air guiding piece 511.

The first air guiding piece 511 is provided with a covering edge 5111 extending toward an outside of the housing 12. When the first air guiding piece 511 covers on an upper portion of the housing 12, the covering edge 5111 covers the air inlet 15. In some embodiments, the air inlet 15 is configured as a shutter, and a limiting bar 5112 is further arranged on the first air guiding piece 511. When the first air guiding piece 511 covers on the upper portion of the housing 12, the limiting bar 5112 is located outside the air inlet 15.

The power head 100 further includes a preformed plate 26, which is arranged between the battery pack cavity 2 and the second air guiding piece 512 to fixedly connect the battery pack cavity 2 with the second air guide piece 512.

A ventilation area 260 is provided between the preformed plate 26 and the battery pack cavity 2, and the ventilation area 260 is communicated with the guiding air passage. When the airflow enters the guiding air passage from the air inlet 15, it flows into the ventilation area 260 along the second air guiding piece 512, and then enters the battery pack cavity 2 through the ventilation area 260. In some embodiments, the housing 12 is provided with ribs (not shown). When the housing 12 and the cover body 13 are fixed, the ribs are tightly matched with the second air guiding piece 512 so that the airflow can only sink along the second air guiding piece 512 and enter the ventilation area 260.

Figure 6:
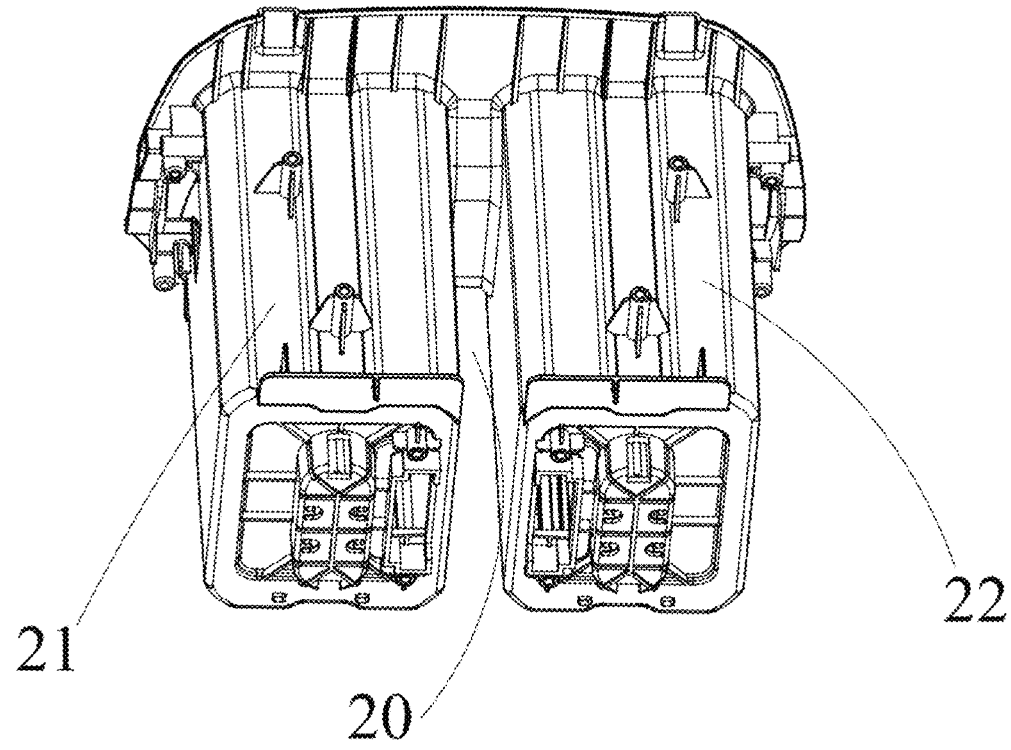
FIG. 6 is a schematic structural view of a battery pack cavity in FIG. 5.
Figure 7:
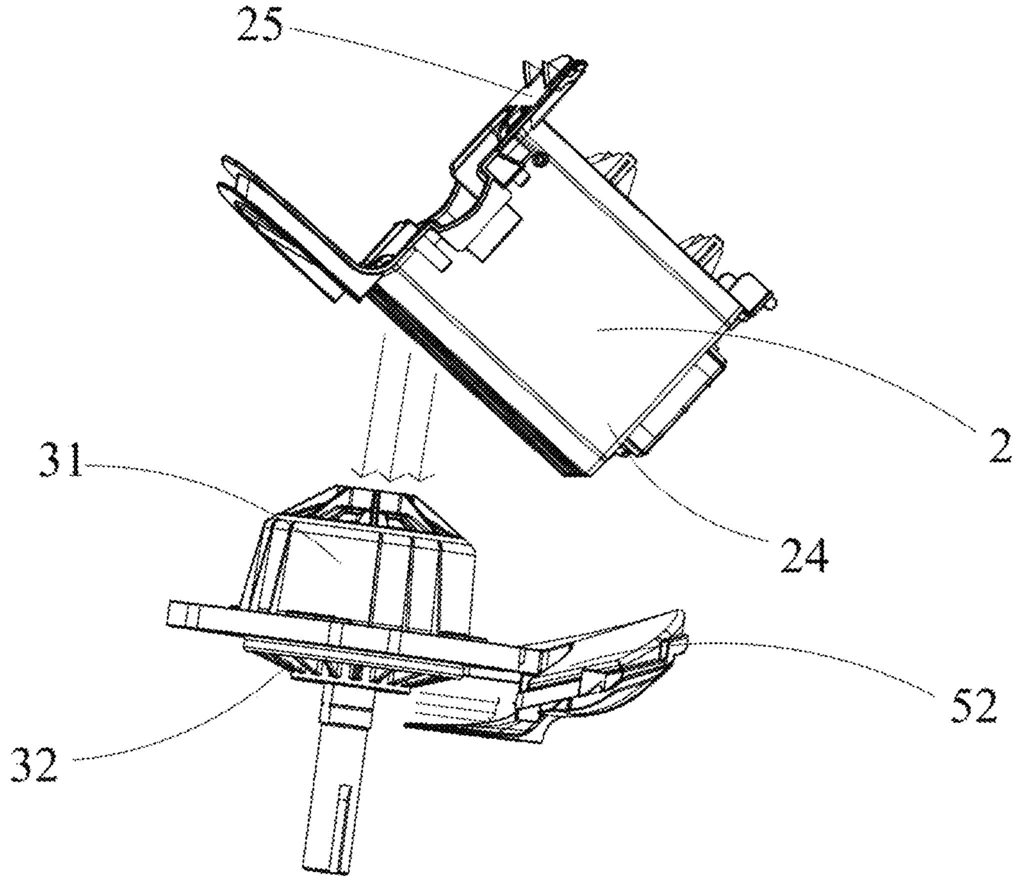
FIG. 7 is an exploded view of the battery pack cavity and a motor in FIG. 2.

Please refer to FIG. 6 and FIG. 7. The battery pack cavity 2 is used to accommodate a battery pack (not shown), and includes a first battery pack cavity 21 and a second battery pack cavity 22 arranged in parallel with each other. A gap 20 is arranged between the first battery pack cavity 21 and the second battery pack cavity 22, and the airflow sinks into the motor 3 along the gap 20. In this way, the airflow passes through the battery pack cavity 2 to dissipate heat from the battery pack in the battery pack cavity 2. Of course, in other embodiments, a number of battery pack cavities 2 may be adjusted according to actual needs and is not limited here.

In an embodiment, the battery pack cavity 2 is tilted and includes a relatively low first end 24 and a second end 25 tilted upward from the first end 24. The motor 3 is arranged below the second end 25. In other words, the power head 100 is tilted as a whole to completely accommodate the battery pack cavity 2. At the same time, a tilted arrangement enables an interior of the power head 100 to be more compact to a certain extent, thereby improving a space utilization rate. Moreover, an airflow passage may also be arranged through arranging different components at different positions.

The motor 3 includes a motor body 31 and a fan 32. The fan 32 is connected with the motor body 31 and is located below the motor body 31. The fan 32 faces the air outlet 16 directly, so that the airflow that sinks into the motor 3 can be discharged from the air outlet 16 under an action of the fan 32.

The second air guiding plate 52 is connected between the fan 32 and the air outlet 16, and is used to guide the airflow flowing out of the motor 3 to be discharged through the air outlet 16.

Figure 9:
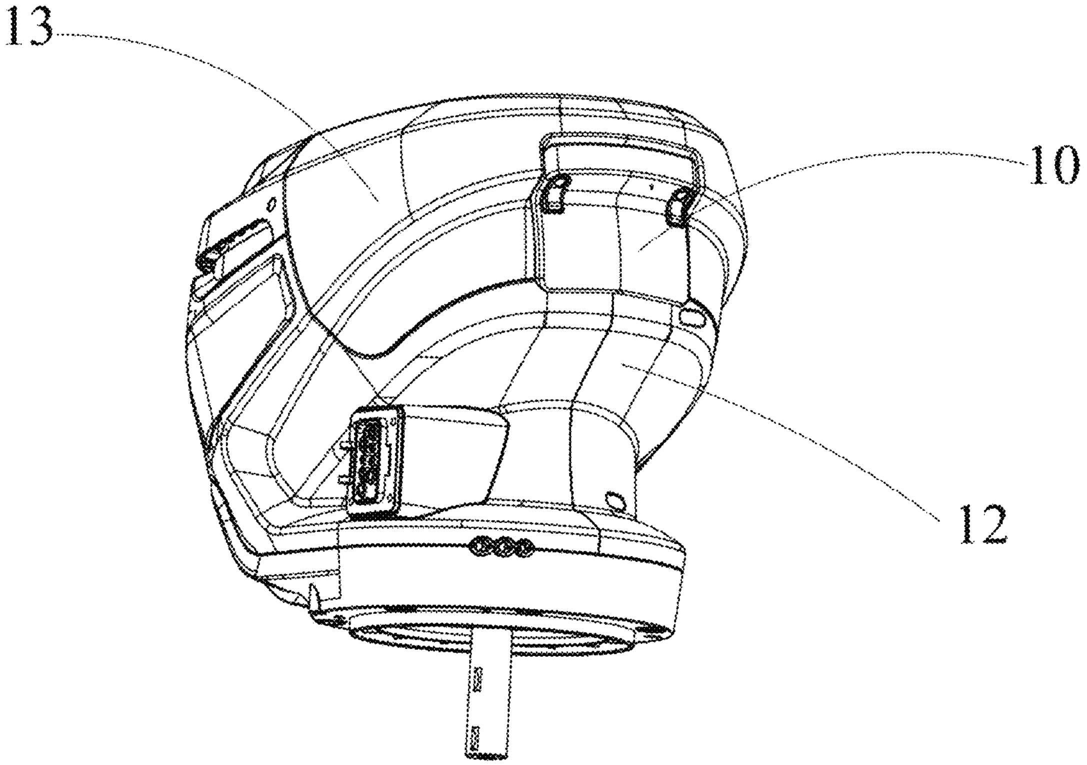
FIG. 9 is a schematic structural view of the power head in FIG. 1 from another angle.
Figure 10:
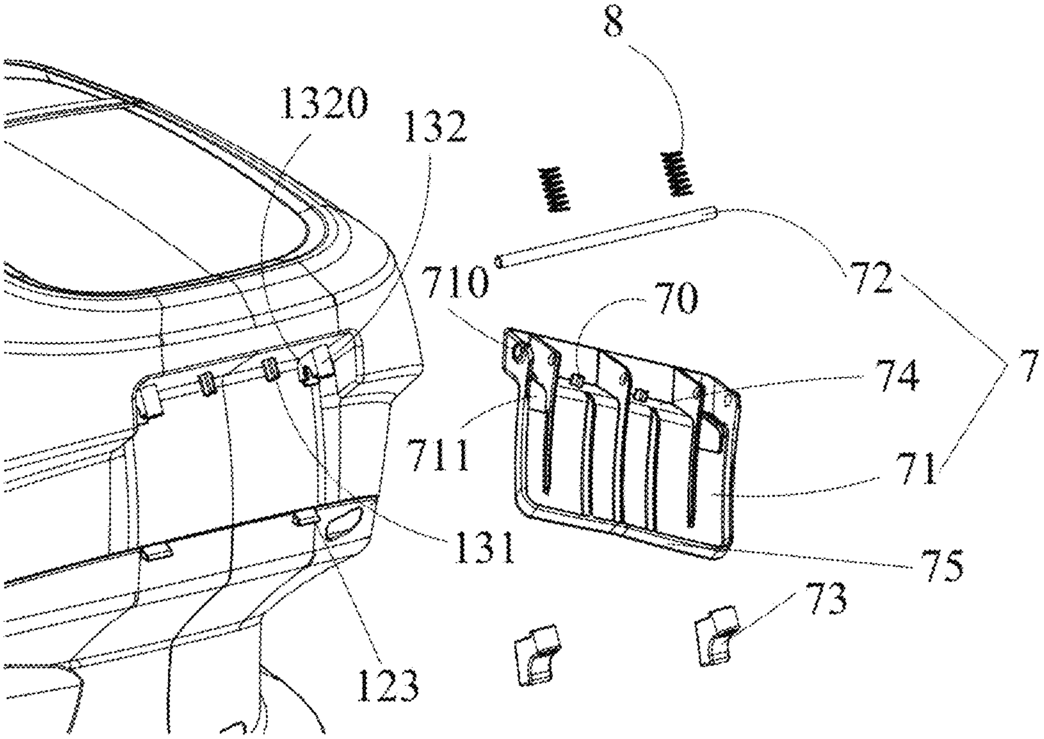
FIG. 10 is an exploded view of a flip cover locking device in FIG. 9.

Please refer to FIG. 9 and FIG. 10. The power head 100 further includes a flip cover locking device 10. The flip cover locking device 10 includes a flip cover 7 and a biasing component 8 arranged between the cover body 13 and the flip cover 7 and can deform under an action of an external force. In some embodiments, there are two biasing components 8 and are spaced apart from each other.

A first end of the flip cover 7 is pivotally connected with the cover body 13, and a second end of the flip cover 7 is buckled with the housing 12. The flip cover 7 includes a locked state and an activated state, when the flip cover 7 is in the locked state, the biasing component 8 is in a free state, the flip cover 7 is fixedly connected with the housing 12, the cover body 13 is in a closed state, when the flip cover 7 is in the activated state, the biasing component 8 is compressed, and the flip cover 7 is released from the housing 12 and can rotate relative to the cover body 13, so that the cover body 13 can be opened relative to the housing 12. In other words, the flip cover 7 is used to lock the cover body 13 and the housing 12, so that the casing 1 is kept in a closing state under normal circumstances, and the cover body 13 may be opened when necessary to expose an interior of the casing 1. In some embodiments, when the cover body 13 is opened, the battery pack cavity 2 is exposed so that the battery pack may be replaced.

In this embodiment, when the flip cover 7 is in the activated state, the cover body 13 is not in contact with the housing 12 and can be clearly observed so as to be locked in time.

An active area allowing the flip cover to move is provided between the cover body 13 and the flip cover 7, when the flip cover 7 is pushed to move toward the cover body 13, the biasing component 8 is squeezed and deformed, the flip cover 7 can rotate relative to the cover body 13, when the flip cover 7 is released, the biasing component 8 is reset, and the flip cover 7 is reset under an action of a rebound force. In an embodiment, the active area is a distance that the biasing component 8 is compressed by pressing. Of course, in other embodiments, other locking methods may also be selected, such as arranging an extending locking block on the flip cover 7 to enable the flip cover 7 to switch between a locked state and the activated state by rotating. In the locked state, the flip cover 7 is fixed on the cover body 13, and the locking block is matched with the housing 12 to fix the cover body 13 with the housing 12, which is not limited here.

In this embodiment, an extending area 74 is arranged outwardly at an upper portion of the flip cover 7, and the extending area 74 serves as a pushing button. When in use, a finger surface is placed on the cover board 71, a finger tip abuts against the extending area 74, and the extending area 74 is pushed upward to move the flip cover 7 within the active area.

The cover body 13 is provided with a limiting block 131, the flip cover 7 is correspondingly provided with a limiting component 70, and two ends of the biasing component 8 are respectively sleeved on the limiting block 131 and the limiting component 70, and can be deformed along with a movement of the flip cover 7 in the active area. Of course, in other embodiments, the biasing component 8 may be directly fixed to the housing 12 and the cover body 13 through fixing accessories such as screws. It only needs to ensure that the biasing component 8 can be compressed/reset within a certain range, which is not limited here.

The flip cover includes a cover board 71 and a connecting shaft 72 connected with the cover board 71, the cover board 71 is provided with a through hole 710, the connecting shaft 72 passes through the through hole 710 and is movably connected with the cover board 71, so that the cover board 71 is pivotally connected with the cover body 13 through the connecting shaft 72.

The cover body 13 is provided with a matching part 132 protruding toward the cover board 71, and the cover board 71 is correspondingly provided with an engaging part 73, the engaging part 73 is sleeved on an outer side of the matching part 132 to limit the connecting shaft 72 between the matching part 132 and the engaging part 73. In some embodiments, there are two matching part 132, which are respectively arranged on two sides of the biasing components 8.

A groove 1320 is concavely formed on a side of the matching part 132 facing the cover board 71, when the engaging part 73 is sleeved on the outer side of the matching part 132, the groove 1320 and the engaging part 73 together enclose an accommodating cavity, and the connecting shaft 72 is accommodated in the accommodating cavity. The cover board 71 is provided with an assembling groove 711, and the engaging part 73 is accommodated in the assembling groove 711.

In this embodiment, the engaging part 73 is an independent component. After the connecting shaft 72 is placed into the groove 1320, the engaging part 73 passed through the assembling groove 711 to be matched with the groove 1320 to realize a fixation of the engaging part 73 and the matching part 132 of the cover body, and then the connecting shaft 72 is fixed in the accommodating cavity to fix the cover board 71 with the cover body 13. In some embodiments, the matching part 132 and the engaging part 73 are each provided with a screw hole. When mounting the matching part 132 and the engaging part 73, the two screw holes are aligned with each other, and screws pass through the screw holes to fix the matching part 132 with the engaging part 73 together. In other embodiments, the engaging part 73 may also be configured as a preformed component integrally formed with the flip cover 7, so that when mounting the connecting shaft 72, the flip cover 7 and the cover body 13 are fixed simultaneously.

A buckle 123 is arranged on one side of the housing 13 close to the cover body 12, a buckle component 75 is correspondingly arranged on the flip cover 7, and the buckle 123 and the buckle component 75 are matched with each other to realize a buckle connection between the flip cover 7 and the housing 12.

Please refer to FIG. 8. An outer side of the casing 1 is provided with a mounting groove 18 for accommodating a mounting belt 19. The mounting groove 18 divides the power head 100 into two parts in a vertical direction. A through groove (not shown) is arranged on the upper portion of the housing 12. A connecting component 17 located below the mounting belt 19 is used to enable the connecting component 17 to pass through the through groove and to be fixedly connected with the cover body 13. The connecting component 17 is generally in a bent crescent shape and is provided with a plurality of positioning holes 171. The cover body 13 is correspondingly provided with a preformed post 133. The preformed post 133 is accommodated in the positioning holes 171 to achieve a fixed connection between the cover body 13 and the connecting component 17. In other words, the cover body 13 is fixedly connected with the mounting belt 19 through the connecting component 17. In some embodiments, the mounting belt 19 covers both the housing 12 and the cover body 13, and the connecting component 17 is partially accommodated in the first air guiding plate 51.

In summary, the power head 100 in one or more embodiments of the disclosure is provided with the flip cover locking device 10 that can be switched between the locked mode and the activated mode, which includes the flip cover 7 that is pivotally connected with the cover body 13 at the first end and buckled with the housing 12 at the second end, and the biasing component 8 that is arranged between the cover body 13 and the flip cover 7 and can be deformed under the action of the external force, so that the flip cover 7 can rotate along with a deformation of the biasing component 8, and an operation method is simple. At the same time, when the flip cover 7 is in the activated state, the cover body 13 is not in contact with the housing 12 and can be directly observed, which is more convenient to use.

The above embodiments are only used to illustrate technical solutions of the disclosure rather than to limit it. Although the disclosure is described in detail with reference to the preferred embodiments, ordinary technicians in this field should understand that the technical solutions of the disclosure may be modified or replaced by equivalents without departing from a spirit and a scope of the technical solutions of the disclosure.

What is claimed is:

1. A flip cover locking device, comprising:

a housing;

a cover body, the cover body rotatably connected with the housing and being opened and closed relative to the housing;

a flip cover, a first end of the flip cover being pivotally connected with the cover body, and a second end of the flip cover being buckled with the housing; and a biasing component, the biasing component arranged between the cover body and the flip cover and being deformed under an action of an external force;

wherein, the flip cover includes a locked state and an activated state, when the flip cover is in the locked state, the biasing component is in a free state, the flip cover is fixedly connected with the housing, the cover body is in a closed state; when the flip cover is in the activated state, the biasing component is compressed, and the flip cover is released from the housing and rotates relative to the cover body, so that the cover body is opened relative to the housing;

wherein, the flip cover comprises a cover board and a connecting shaft connected with the cover board, so that the cover board is pivotally connected with the cover body through the connecting shaft;

wherein, the cover body is provided with a matching part protruding toward the cover board, and the cover board is provided with an independent engaging part passed through an assembling groove of the cover board and sleeved on an outer side of the matching part to limit the connecting shaft between the matching part and the independent engaging part.

2. The flip cover locking device according to claim 1, wherein, an active area allowing the flip cover to move is provided between the cover body and an upper portion of the flip cover, when the upper portion of the flip cover is pushed to move toward the cover body, the biasing component is squeezed and deformed, the flip cover rotates relative to the cover body; when the upper portion of the flip cover is released, the biasing component is reset, and the flip cover is reset under an action of a rebound force of the biasing component.

3. The flip cover locking device according to claim 2, wherein, the cover body is provided with a limiting block, the flip cover is correspondingly provided with a limiting component, and two ends of the biasing component are respectively sleeved on the limiting block and the limiting component, and is deformed along with a movement of the flip cover in the active area.

4. The flip cover locking device according to claim 1, wherein, the cover board is provided with a through hole, and the connecting shaft passes through the through hole and is movably connected with the cover board.

5. The flip cover locking device according to claim 1, wherein, a groove is concavely formed on a side of the matching part facing the cover board, when the independent engaging part is sleeved on the outer side of the matching part, the groove and the independent engaging part together enclose an accommodating cavity, and the connecting shaft is accommodated in the accommodating cavity.

6. The flip cover locking device according to claim 1, wherein, the independent engaging part is accommodated in the assembling groove.

7. The flip cover locking device according to claim 1, wherein, two biasing components are provided, the two biasing components are spaced apart from each other, two matching parts are provided, and the two matching parts are respectively arranged on two sides of the two biasing components.

8. The flip cover locking device according to claim 1, wherein, a buckle is arranged on one side of the housing close to the cover body, a buckle component is correspondingly arranged on the flip cover, and the buckle and the buckle component are matched with each other to realize a buckle connection between the flip cover and the housing.

9. A power head, comprising:

a battery pack cavity; and a flip cover locking device, comprising:

a housing, the battery pack cavity being accommodated in the housing;

a cover body, the cover body rotatably connected with the housing and opened and closed relative to the housing;

a flip cover, a first end of the flip cover being pivotally connected with the cover body, and a second end of the flip cover being buckled with the housing; and a biasing component, the biasing component arranged between the cover body and the flip cover, and deformed under an action of an external force;

wherein, the flip cover includes a locked state and an activated state, when the flip cover is in the locked state, the biasing component is in a free state, the flip cover is fixedly connected with the housing, the power head is in a closed state; when the flip cover is in the activated state, the biasing component is compressed, and the flip cover is released from the housing and rotates relative to the cover body, at this time the cover body is opened relative to the housing and exposes the battery pack cavity;

wherein, the flip cover comprises a cover board and a connecting shaft connected with the cover board, so that the cover board is pivotally connected with the cover body through the connecting shaft;

wherein, the cover body is provided with a matching part protruding toward the cover board, and the cover board is provided with an independent engaging part passed through an assembling groove of the cover board and sleeved on an outer side of the matching part to limit the connecting shaft between the matching part and the independent engaging part.

* * * * *